(12) United States Patent
Yang

(10) Patent No.: US 6,681,416 B1
(45) Date of Patent: Jan. 27, 2004

(54) SOFT BATHROOM MAT AND A METHOD FOR PRODUCING THE SOFT BATHROOM MAT

(75) Inventor: Tsai-Chin Yang, Ta Li (TW)

(73) Assignee: Golden Pond Plastic Manufacturing Company Ltd. (TW)

(*) Notice: Subject to any disclaimer, the term of this patent is extended or adjusted under 35 U.S.C. 154(b) by 0 days.

(21) Appl. No.: 10/270,818

(22) Filed: Oct. 14, 2002

(51) Int. Cl.[7] ................................................ A47K 3/02
(52) U.S. Cl. .................................. 4/583; 4/581; 4/582
(58) Field of Search ........................... 4/581, 582, 583; 428/156, 99, 217, 76, 411, 500, 523.1, 68, 131, 132, 138, 166, 178, 174

(56) References Cited

U.S. PATENT DOCUMENTS

| 348,782 A | * | 9/1886 | Sawyer ...................... 4/571.1 |
| 2,820,454 A | * | 1/1958 | Wright ......................... 601/28 |
| 4,173,216 A | * | 11/1979 | Nolet ............................. 4/583 |
| D336,198 S | * | 6/1993 | Gibbons ...................... D6/583 |
| D414,973 S | * | 10/1999 | Craft et al. .................. D6/583 |
| 6,022,608 A | * | 2/2000 | Dell 'Acqua ............... 428/132 |
| 6,413,609 B1 | * | 7/2002 | Yates ........................... 428/76 |

OTHER PUBLICATIONS

US 2002/0114926 A1; Aug. 22, 2002; Malpass et al.*

* cited by examiner

Primary Examiner—Gregory L. Huson
Assistant Examiner—Khoa Huynh
(74) Attorney, Agent, or Firm—Dellett & Walters

(57) ABSTRACT

A method for producing a soft bathroom mat comprising the acts of obtaining a base layer (10), obtaining an upper layer mold (20), applying a surface membrane (24) to the mold (20), pouring gel (26) into fillisters (22) in the mold (20) and applying a bottom membrane (28) to the filled mold (20) to enclose the gel with the surface membrane (24) to form the upper layer and laminating the upper layer to the base layer and trimming any excess material from the completed soft bathroom mat.

4 Claims, 9 Drawing Sheets

SOFT BATHROOM MAT AND A METHOD FOR PRODUCING THE SOFT BATHROOM MAT

BACKGROUND OF THE INVENTION

1. Field of the Invention

The present invention relates to a bathroom mat and a method for producing the bathroom mat, and more particularly to a soft bathroom mat with multiple soft bumps to make the bathroom mat have a special feeling like touching real flesh and a method for producing the soft bathroom mat.

2. Description of Related Art

With reference to FIG. 7, a conventional bathroom mat is composed of a plastic base (70) and multiple of nonskid bars (60) embedded in the plastic base (70) to form patterns. The nonskid bars (60) are made of rigid or resilient materials in different colors to form vivid patterns or designs. Part of each nonskid bar (60) protrudes from the plastic base (70) to enhance the nonskid efficiency of the bathroom mat. However, the nonskid bars (60) are often uncomfortable when users step on the bathroom mat because the nonskid bars (60) material is rigid.

Therefore, the present invention has arisen to mitigate or obviate the drawbacks of the conventional bathroom mat.

SUMMARY OF THE INVENTION

The main objective of the present invention is to provide a method for producing a bathroom mat that feels like real flesh.

Further benefits and advantages of the present invention will become apparent after a careful reading of the detailed description with appropriate reference to the accompanying drawings.

DETAILED DESCRIPTION OF THE INVENTION

Figure 1:
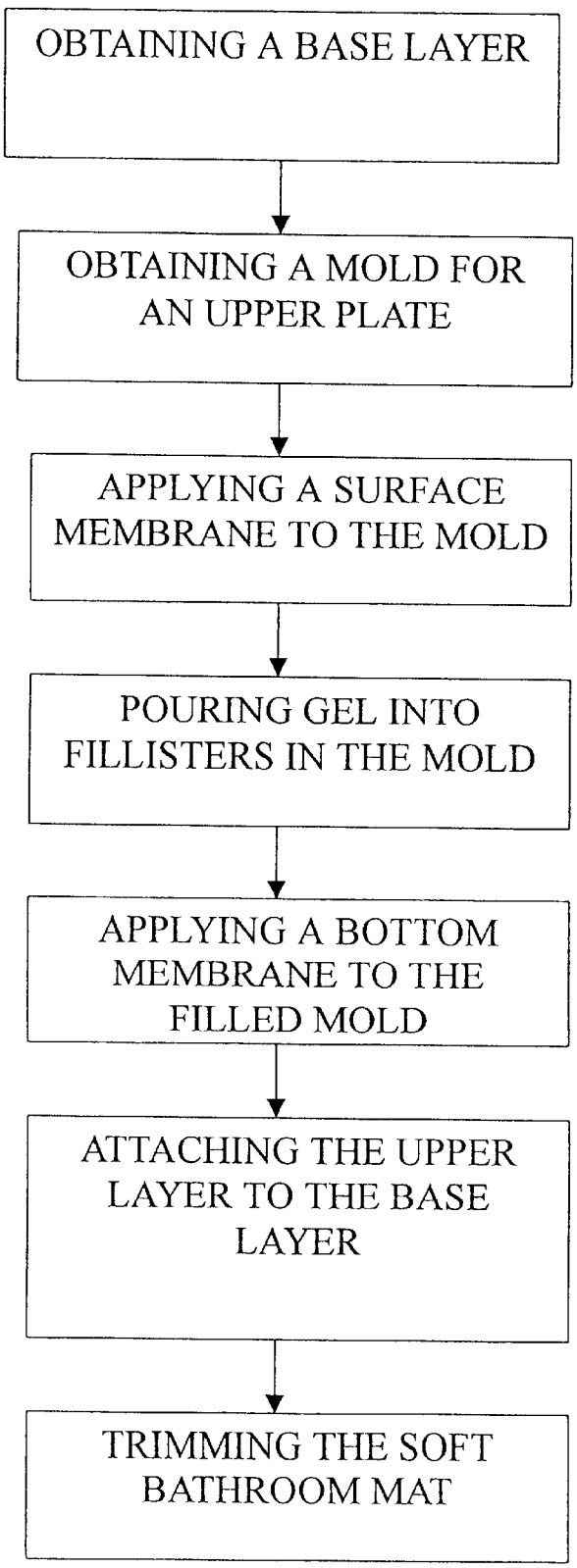
FIG. 1 is a block diagram of a method for producing a soft bathroom mat in accordance with the present invention.

With reference to FIGS. 1, 2 and 3A–3E, a method for producing a soft bathroom mat in accordance with the present invention comprises the acts of obtaining a base layer (10), obtaining an upper layer mold (20), applying a surface membrane (24) to the mold (20), pouring gel (26) into the fillisters (22), applying a bottom membrane (28) to the filled mold (20), attaching the upper layer (30) to the base layer (10) and trimming the soft bathroom mat.

Figure 2:
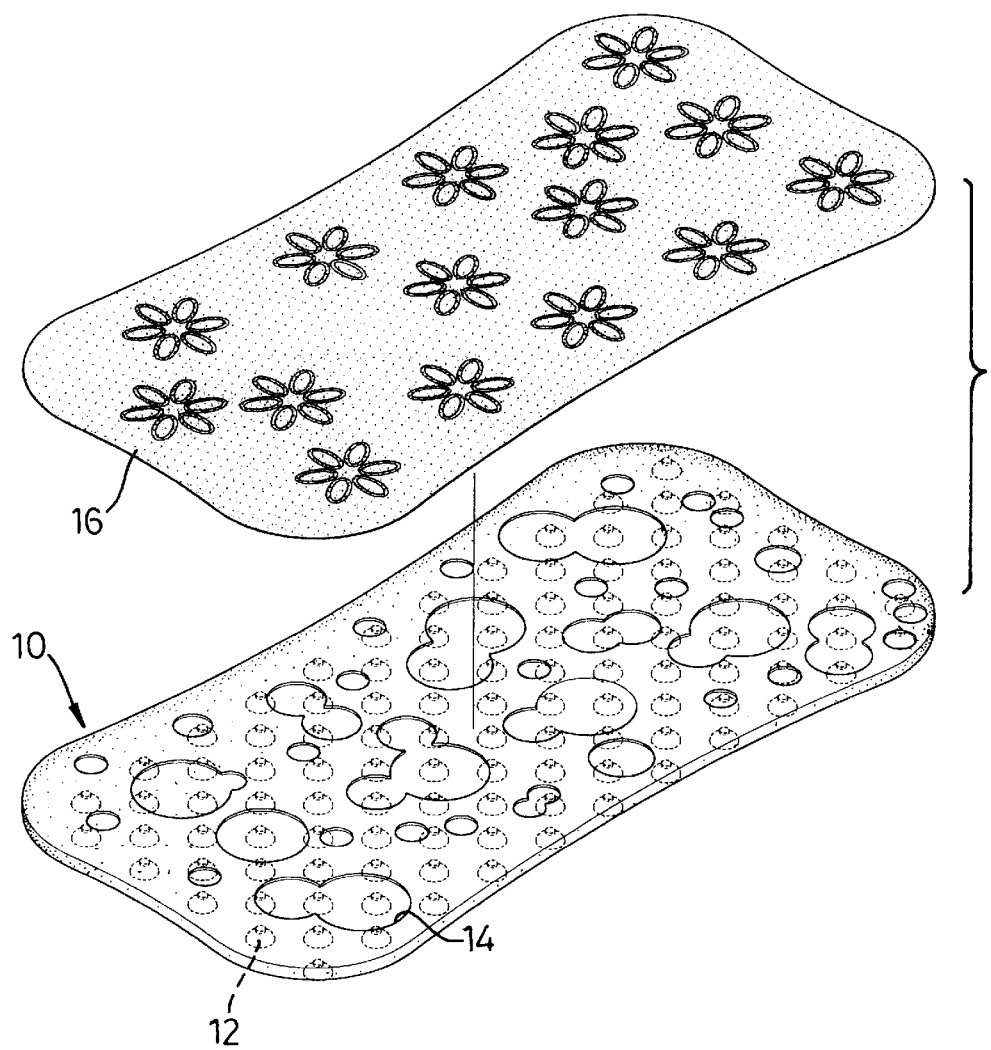
FIG. 2 is an exploded perspective view of the base layer and the cohesive layer soft bathroom mat in accordance with the present invention.

With reference to FIG. 2, a base layer (10) made of resin has a top face and a bottom face. Multiple suction cups (12) are formed on the bottom face to make the bathroom mat firmly attach to smooth surfaces. Multiple recesses (14) are defined in the top face of the base layer (10). Additionally, a cohesive layer (16) is laminated on the top face of the base layer (10) to add body to the base layer (10). The cohesive layer (16) is preferably made of cloth.

The upper layer mold (20) has a top face and multiple fillisters (22) defined in the top face. With reference to FIG. 3A, the fillisters (22) are dome-shaped.

Figure 3B:
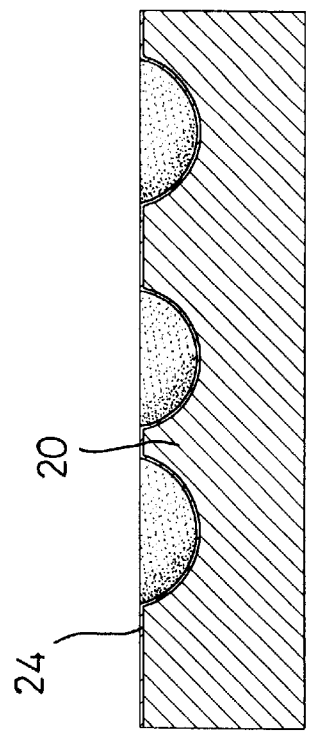
FIGS. 3A–3E are cross-sectional side plan views of the soft bathroom mat in various stages of the method in FIG. 1.
Figure 3A:
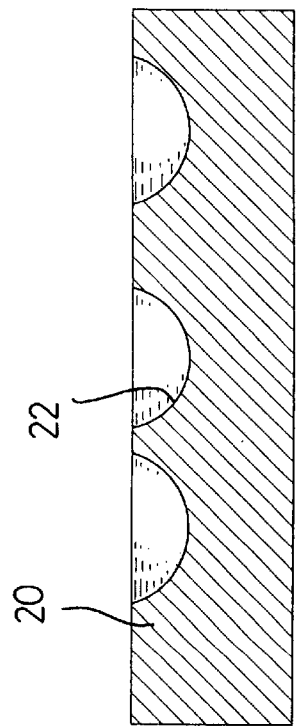

With reference to FIG. 3B, the top face of the mold (20) including the fillisters (22) is completely coated with a layer of polyurethane (PU) liquid. After 2 minutes, the layer of PU liquid solidifies and becomes the surface membrane (24).

Figure 3D:
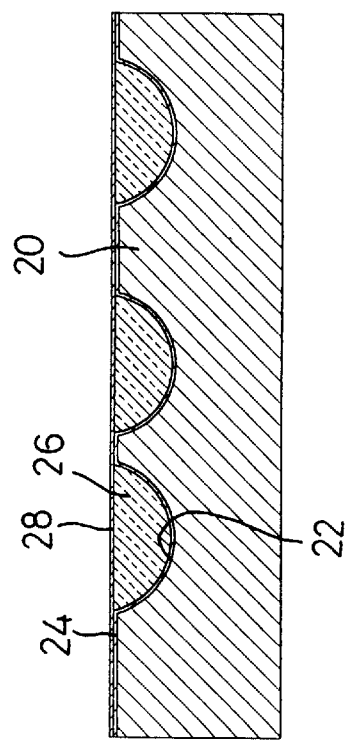
Figure 3C:
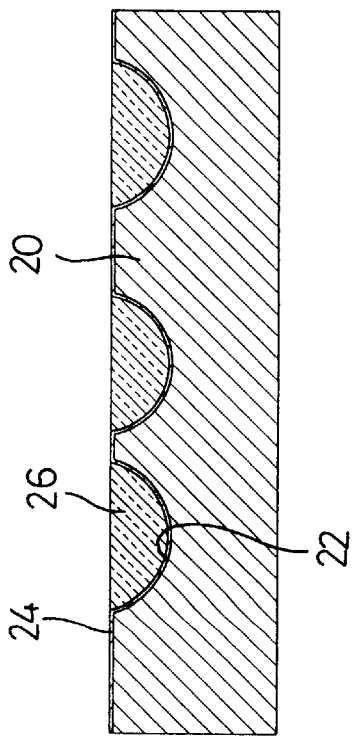

With reference to FIG. 3C, gel (26) is poured into each fillister (22) until the gel (26) is level with the top face of the mold (20). The gel (26) is PU liquid mixed with forming agents, which makes the PU foam, in different proportions to control the softness of the gel (26).

With reference to FIG. 3D, a layer of PU liquid is applied to the filled mold (20) to cover the gel (26) and bonds with the surface membrane (24) to form soft bumps filled with gel (26). After 2 min, the layer of PU liquid solidifies to form a bottom membrane (28) that encloses the gel (26) between the surface and bottom membranes (24, 28). The combination of the surface and bottom membranes (24, 28) with enclosed pockets of gel (26) constitute the upper layer (30). Additionally, a layer of plastic liquid (including PU liquid) is further applied to the bottom membrane (28) (not shown in Figures) to form a rigid middle layer to support the soft bumps.

Figure 3E:
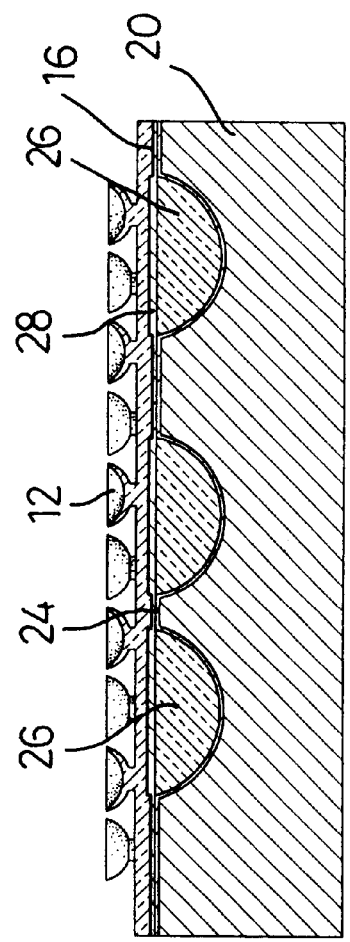

With reference to FIG. 3E, the base layer (10) with the cohesive layer (16) facing the bottom membrane (28) of the upper layer (30) is attached to the upper layer (30). In the process of attaching the upper layer (30) to the base layer (10), the PU liquid of the bottom membrane (28) is squeezed to fill the recesses (14) of the base layer (10) and the soft bumps are aligned with the recesses (14) in the base layer (10). Then the bottom membrane (28) is melted slightly to permeate the cloth of the cohesive layer (16) to firmly attach the upper layer (30) to the base layer (10) to complete the soft bathroom mat having soft bumps.

After the soft bathroom mat has cured for 8 hours, any PU material that has squeezed out of the bathroom mat needs to be trimmed off the finished soft bathroom mat.

Figure 4:
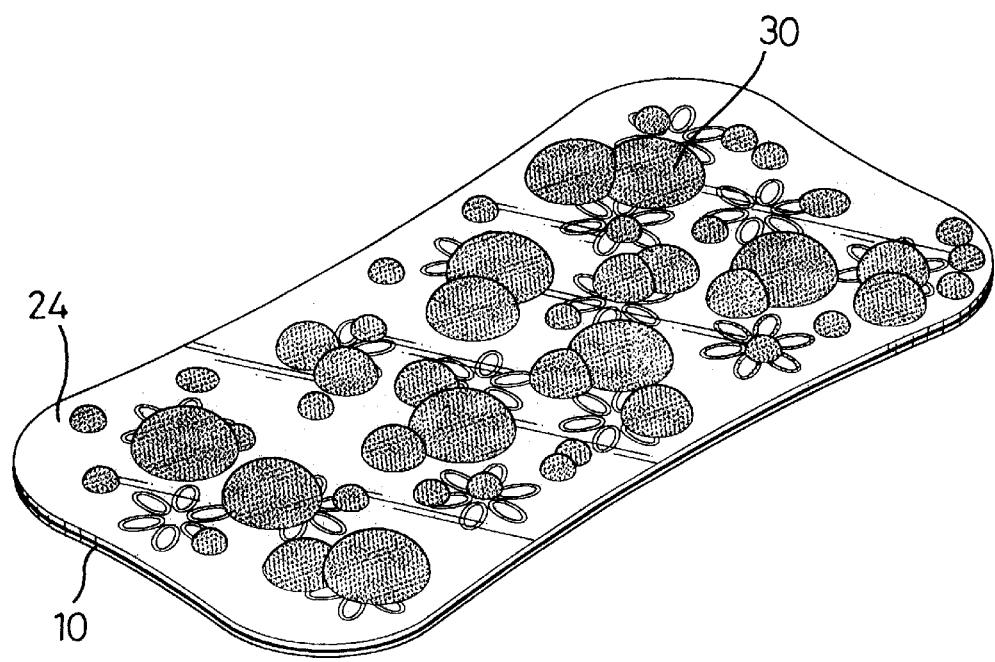
FIG. 4 is a perspective view of the soft bathroom mat in accordance with the present invention.

With reference to FIGS. 3E and 4, the soft bumps in the completed soft bathroom mat are composed of the surface membrane (24), the bottom membrane (28) and gel (26) enclosed between the membranes (24, 28). The membranes (24, 28) made of PU are resilient and durable to allow the bumps to deform slightly when pressed. The gel (26) makes the bumps feel like real flesh. Therefore, when users step on the bathroom mat, the bathroom mat is not uncomfortable.

Additionally, the cohesive layer (16) is preferably made of cloth with vivid patterns to enhance the appearance of the bathroom mat when the membranes (24, 28) are transparent.

Figure 5:
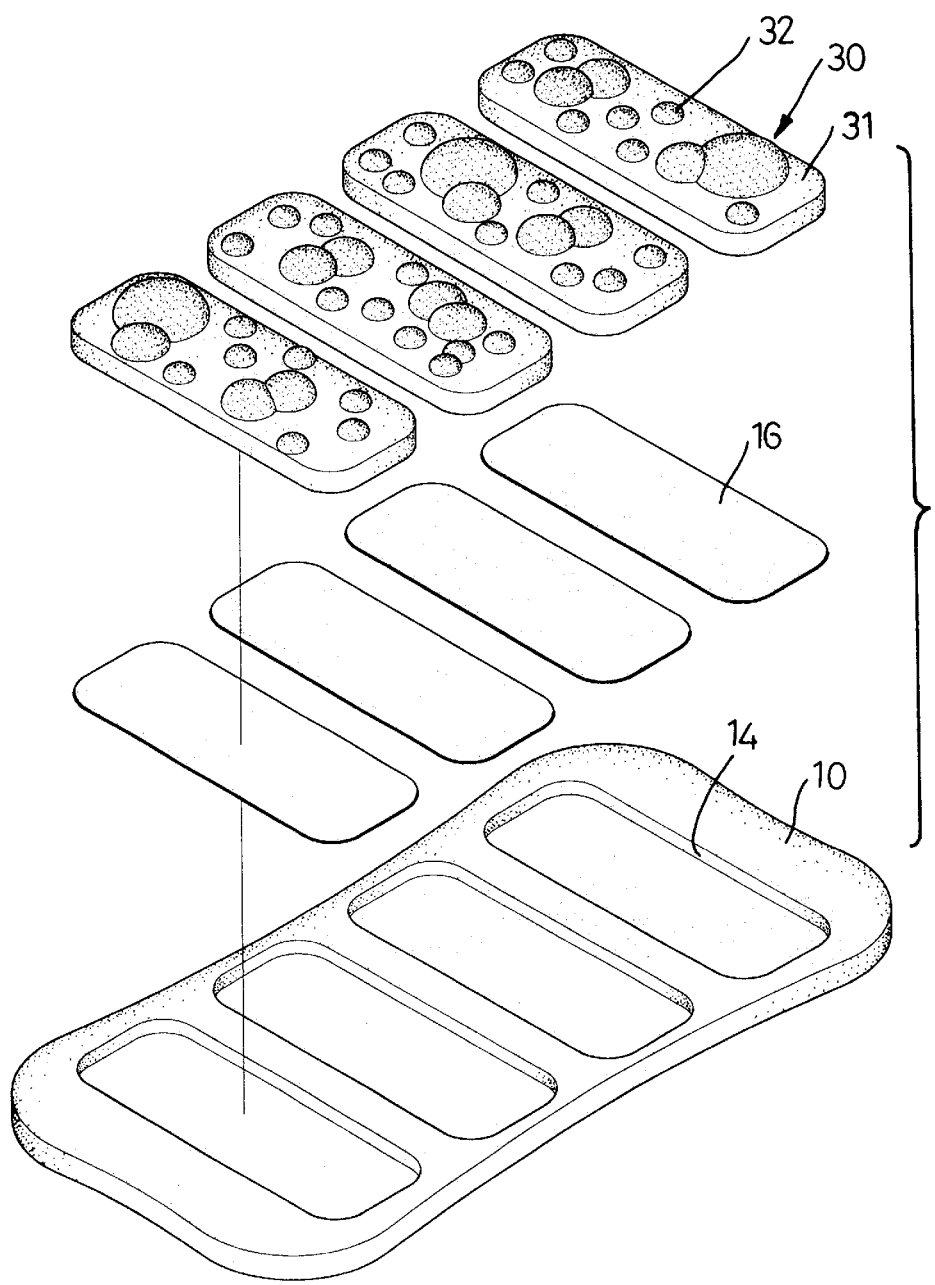
FIG. 5 is an exploded perspective view of another embodiment of the soft bathroom mat in accordance with the present invention.
Figure 6:
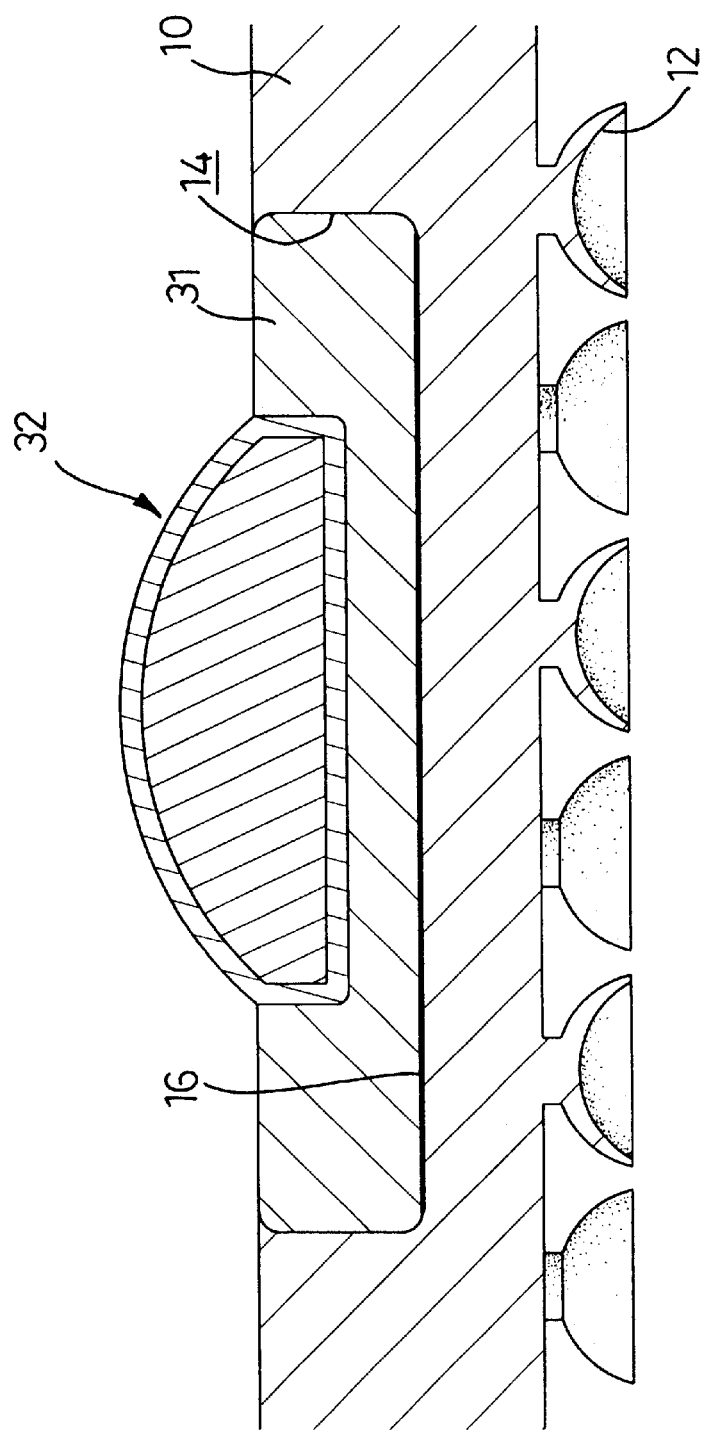
FIG. 6 is a cross-sectional side plan view of the bathroom mat in FIG. 5.
Figure 7:
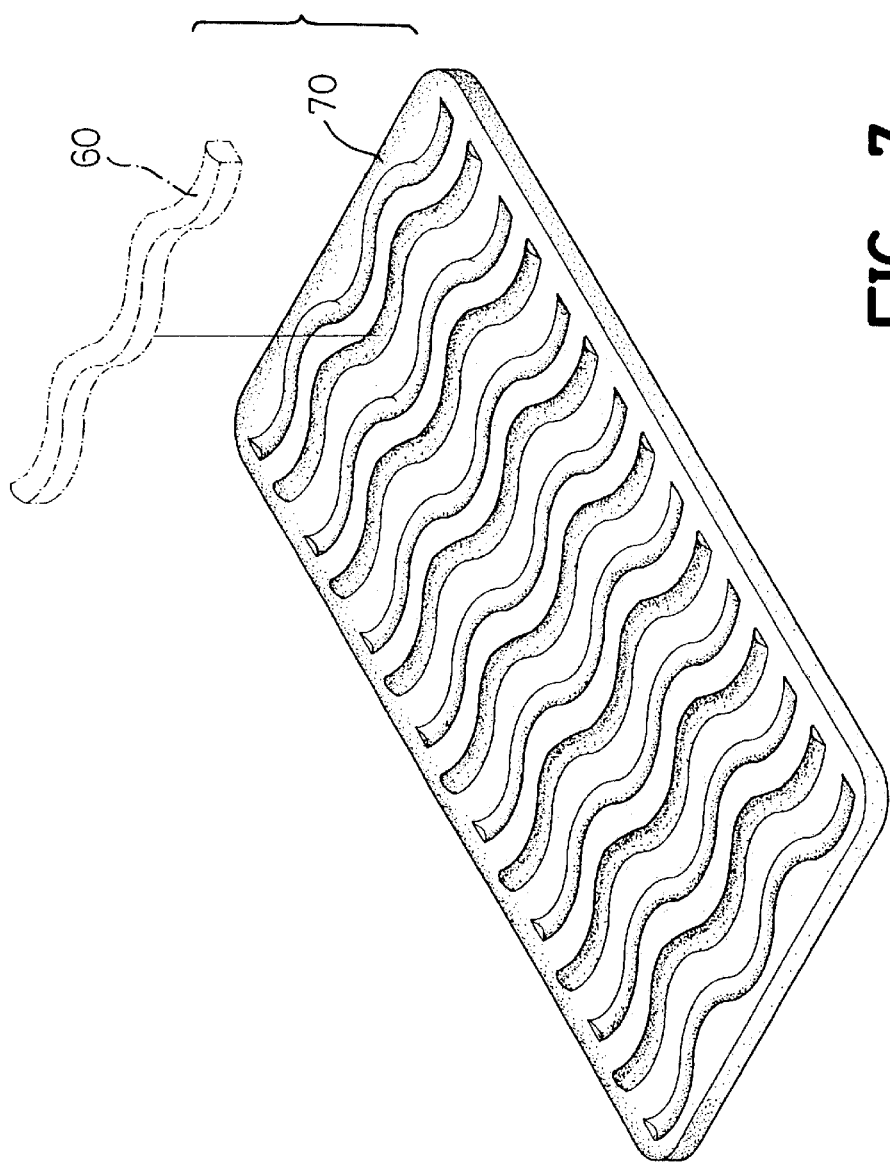
FIG. 7 is an exploded perspective view of a conventional bathroom mat in accordance with the prior art.

With reference to FIGS. 5 and 6, another embodiment of the soft bathroom mat is composed of a base layer (10) with a cohesive layer (16) and an upper layer (30) attached to the base layer (10).

The base layer (10) is made of rubber and has a top face and a bottom face. Multiple suction cups (12) are formed on the bottom face of the base layer (10) and multiple rectangular recesses (14) are defined in the top face of the base layer (10). Moreover, multiple pieces of the cohesive layer (16) are respectively attached inside the recesses (14).

The upper layer (30) is divided into multiple pieces. Each piece of the upper layer (30) further has a middle plate (31) and multiple bumps (32) embedded inside the middle plate (31). Each bump (32) is composed of membranes and gel enclosed inside the membranes. The middle plate (31) corresponds to one of the recesses (14) to contact the cohesive layer (16). The middle plate (31) is made of PU having a degree of rigidness to support the bumps (32). Then, the middle plate (31) is attached to the base layer (10) by compressing the middle plate (31) just after the upper plate (30) is just formed in the mold.

Although the invention has been explained in relation to its preferred embodiment, it is to be understood that many other possible modifications and variations can be made without departing from the spirit and scope of the invention as hereinafter claimed.

What is claimed is:

1. A soft bathroom mat, comprising:

a base layer (10) made of resin and having a top face, a bottom face, multiple suction cups formed on the bottom, and at least one piece of cohesive layer (16) attached to the top face an upper plate (30) laminated on the base layer (10) and having multiple bumps (32) formed on the upper plate (30), wherein each bump (32) is composed of membranes and gel enclosed between the membranes, wherein the base layer (10) further has multiple recesses (14) defined on the top face of the base layer (10) to respectively receive the at least one cohesive layer (16) inside; and the upper plate (30) is divided into multiple pieces, each piece of the upper plate (30) correspond to one of the recesses (14) to make the piece contact a corresponding one of the at least one cohesive layers (16).

2. The soft bathroom mat as claimed in claim 1, wherein the membranes of each bump (32) are made of resilient polyurethane plastic material.

3. The soft bathroom mat as claimed in claim 2, wherein the membranes of each bump (32) are made of transparent and resilient polyurethane plastic material; and the at least one cohesive layer (16) is made of cloth with patterns.

4. The soft bathroom mat as claimed in claim 1, wherein the at least one cohesive layer (16) is made of cloth.

* * * * *